United States Patent [19]
Vosteen

[11] 3,729,675
[45] Apr. 24, 1973

[54] HIGH LEVEL NON-CONTACTING DYNAMIC VOLTAGE FOLLOWER FOR VOLTAGE MEASUREMENT OF ELECTROSTATICALLY CHARGED SURFACES

[76] Inventor: Robert E. Vosteen, 315 West Center Street, Medina, N.Y. 14103

[22] Filed: Feb. 13, 1970

[21] Appl. No.: 11,075

[52] U.S. Cl. ........................................ 324/72, 324/32
[51] Int. Cl. ............................................. G01r 31/02
[58] Field of Search ..................... 324/72, 72.5, 109, 324/123, 32

[56] References Cited

UNITED STATES PATENTS

| | | | |
|---|---|---|---|
| 3,436,648 | 4/1969 | Kim | 324/32 |
| 2,881,266 | 4/1959 | Miller | 324/123 |

*Primary Examiner*—Michael J. Lynch
*Attorney*—Irons, Stockman, Sears & Santorelli

[57] ABSTRACT

A wide band voltage follower circuit for voltage measurement of electrostatically charged surfaces through the use of a probe having a capacitor detector arranged in spaced and non-contacting manner with the surface under measurement to detect the unknown surface voltage thereof, the probe having a cable connected to the output of the capacitor detector. An ultra high impedance low level voltage follower is connected to the capacitor detector output through the cable, and shield means driven by the output of the ultra high impedance low level voltage follower are employed to shield the latter, the cable, and the probe, thereby minimizing the effective input capacitance of the ultra high impedance low level voltage follower. A high level voltage follower is connected to the output of the ultra high impedance low level voltage follower, and a floating power supply is connected to power the ultra high impedance low level voltage follower. The power supply is bootstrapped with the latter by the high level voltage follower through the connection of the common line of the floating power supply to the output of the high level voltage follower. The output of the high level voltage follower is connected to a peak-to-peak detector to derive an output voltage whose D.C. voltage is equal to the D.C. voltage of the surface under measurement.

10 Claims, 6 Drawing Figures

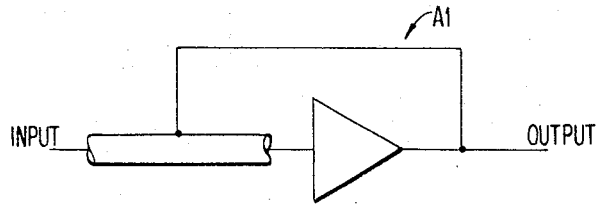
FIG. 1
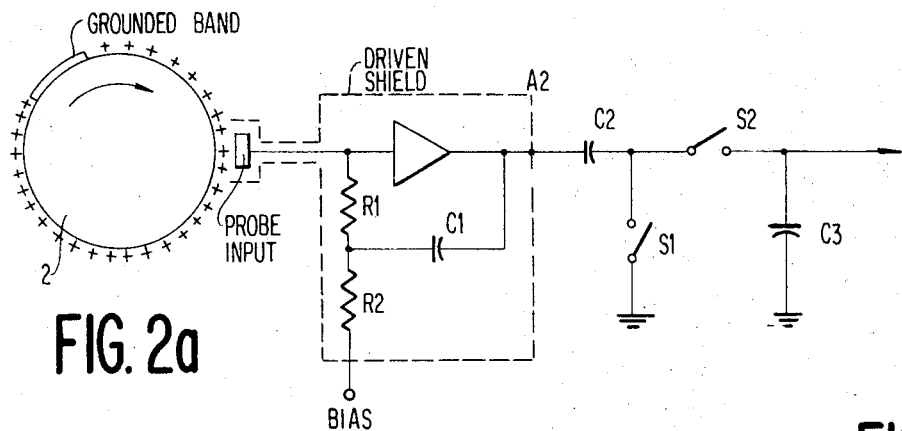
FIG. 2a
FIG. 2b
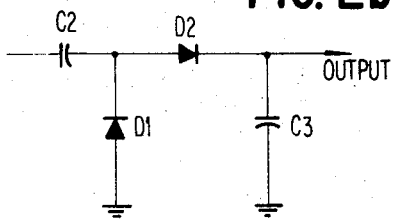
FIG. 3
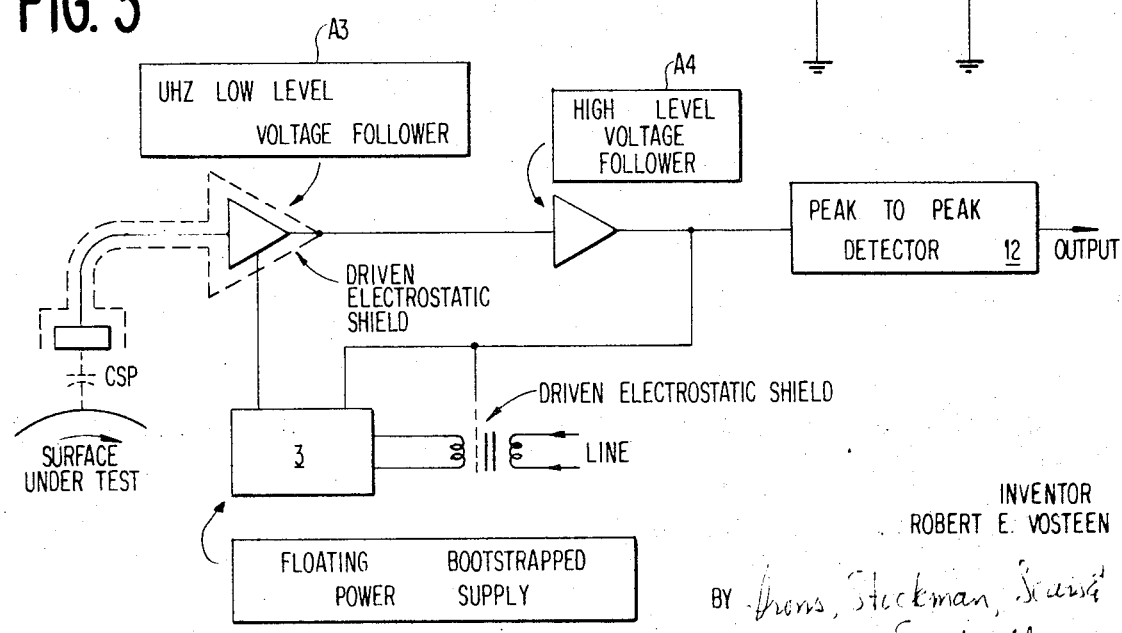
INVENTOR
ROBERT E. VOSTEEN
ATTORNEYS Patented April 24, 1973  3,729,675

INVENTOR
ROBERT E. VOSTEEN

BY
ATTORNEYS

HIGH LEVEL NON-CONTACTING DYNAMIC VOLTAGE FOLLOWER FOR VOLTAGE MEASUREMENT OF ELECTROSTATICALLY CHARGED SURFACES

BRIEF DESCRIPTION OF THE DRAWINGS

FIG. 1 is a block diagram illustrating an operating principle of the invention;

FIGS. 2a and 2b are schematic diagrams more fully showing how the principle illustrated in FIG. 1 is applied to the invention;

FIG. 3 is a block diagram illustrating the invention;

GENERAL DESCRIPTION OF THE INVENTION

Figure 5:
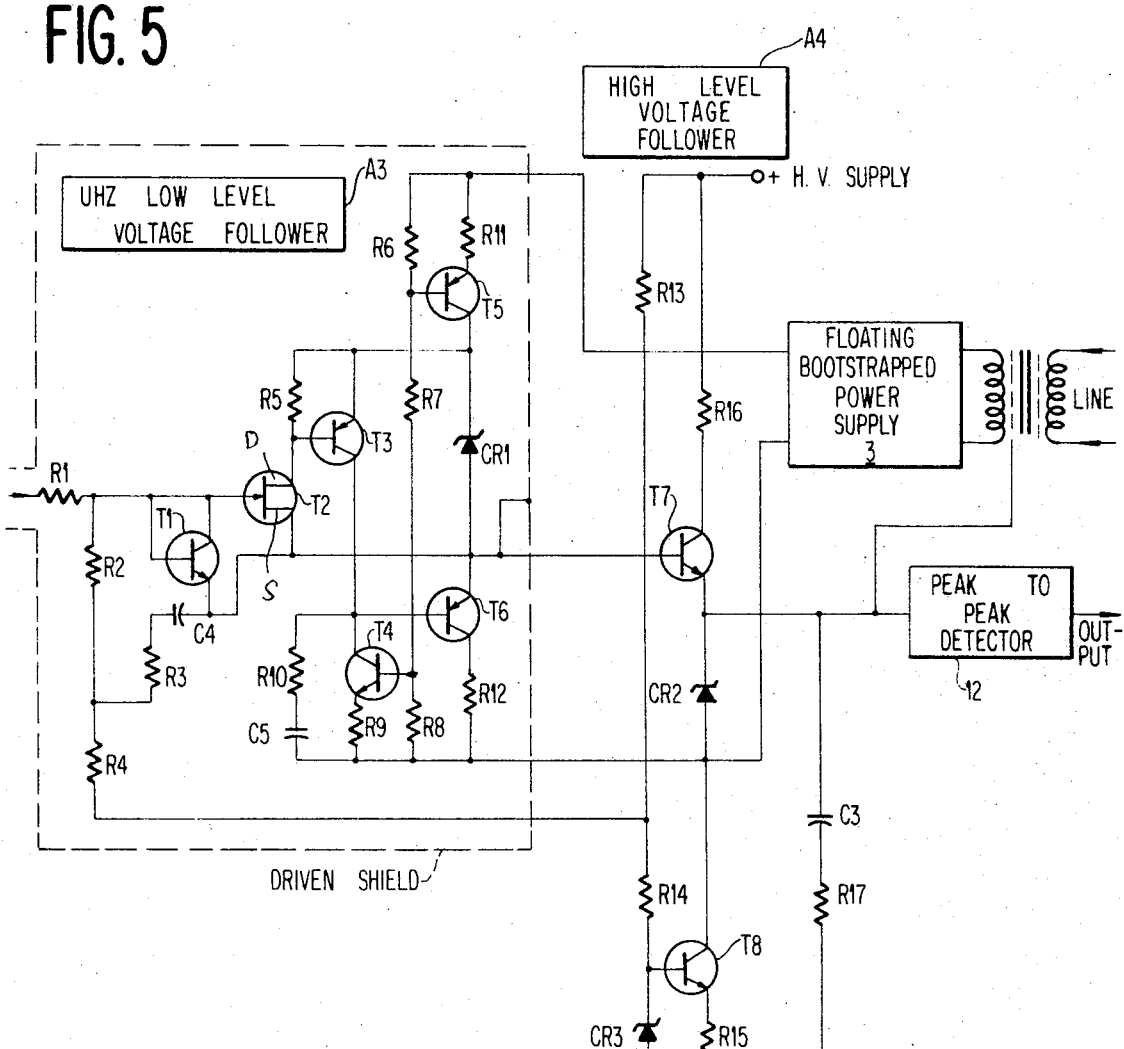
FIG. 5 is an electrical schematic diagram showing in detail a circuit which may be used to practice the invention.

It is known that dynamic voltage measurement of a moving electrostatically charged surface can be made by placing a probe at a fixed distance from the surface in non-contacting manner and connecting the probe to a DC electrometer. This technique of measurement is particularly applicable to the xerography art. The probe comprises a capacitance type of detector and, provided certain criteria are fulfilled, virtually the entire voltage of the surface under measurement can be made to appear at the detector input.

Assuming the use of a capacitance type of detector, the detector will have a voltage induced at its input which is determined by capacitance voltage division formulae. In the following description:

$C_{PS}$ = probe-to-surface capacitance,
$C_D$ = total input capacitance to detector, and
$C_T$ = total series capacitance of $C_{PS}$ and $C_D$.

The relationship between the voltage at the surface under measurement ($V_S$), the voltage associated with the probe-to-surface capacitance ($V_{PS}$), and the voltage at the detector input ($V_D$) is:

$V_S = V_{PS} + V_D$.

Therefore, the following relationship exists:

$Q_T/C_T = Q_{PS}/C_{PS} + Q_D/C_D$
$Q_T = Q_{PS} = Q_D$
$V_S = Q[(1/C_{PS}) + (1/C_D)]$

It is apparent that if the capacitance of the detector $C_D$ is made very small compared to the capacitance value $C_{PS}$ of the probe-to-surface virtually the entire voltage at the surface under measurement would appear at the detector input. Consequently, the detected voltage would be practically independent of the probe-to-surface spacing. A practical range of probe-to-surface spacing would normally provide a probe-to-surface capacitance value $C_{PS}$ of 1 to 10 picofarads. However, the typical input capacitance of a practical open circuited electrometer normally would exceed 10 picofarads. Consequently the total input capacitance $C_D$ to the detector would be relatively high, and the above discussed measurement technique would not be practical unless the effective input capacitance of the detector is reduced by some means.

It is possible to reduce the effective capacitance of the capacitor detector input by feedback means wherein voltage feedback is accomplished by a voltage follower whose output bootstraps physical capacitance. This may be described with relation to FIG. 1 which shows a circuit to reduce the capacitance of coaxial cable 1. Amplifier A1 is connected to function as a unity gain voltage follower and for illustrative purposes is assumed to have a gain of +0.9. The shield of the cable is connected to the output of amplifier A1 as shown in the figure. Under these conditions, the physical capacitance of the cable is reduced to only 10 percent of its initial value (in the absence of the described feedback connection between the output of amplifier A1 and the shield of the cable). If the voltage follower A1 had an even higher gain of, for example, +0.999, only 0.1 percent of the physical capacitance of the cable would be effective as a load on the input source. This bootstrapping technique can also be used to reduce the effective input capacitance to the voltage follower A1 itself with the result that input impedances may be reduced to practical values wherein $R_{IN} > 10^{13}$ ohms and $C_{IN} < 0.01$pf. Further these values can be obtained through the use of conventional components.

Under such circumstances, if a probe having a capacitance value varying from one to ten picofarads is connected to voltage follower A1, the capacitance voltage divider error never exceeds 1 percent and a useful device results.

A practical limitation of the described device is that it is not capable of stable operation to DC but rather is a dynamic device capable of accurate measurements of change of voltage. This lack of DC measurement capability can be circumvented if it is possible to periodically scan a surface of known potential. A DC restorer can thus be employed to reference all known voltages to this known voltage.

Consider the case, for example, where all measurements to be made are of only one polarity and the probe periodically scans a grounded surface. With reference to FIG. 2a, voltage follower A2 has a closed loop gain of >0.9999 and its input resistor R1 is $10^9$ ohms. Resistor R1 is bootstrapped by capacitor C1 (0.1 uf.) and resistor R2 ($10^8$ ohms) thus markedly increasing the effective value of resistor R1 in the useful frequency spectrum.

All input wiring is shielded and the shield is driven by the amplifier output as shown. The input electrode thus has coupling capacitance to the surface of drum 2 under test but negligible capacitance otherwise because all stray capacitance is minimized by feedback via the driven shield. The surface of drum 2 is assumed to be uniformly positively charged, except for the grounded band portion.

The output of voltage follower A2 is coupled to the illustrated DC restorer circuit, and the output voltage is equal to the DC voltage of the charged surface. Through conventional control means (not shown) switch S1 shorts capacitor C2 to ground while the probe scans the grounded band on the drum surface and switch S2 couples capacitor C2 to capacitor C3 while the positively charged surface under test is being sampled. The more general case would be to connect switch S1 and capacitor C3, as well as the grounded band of drum 2, to a reference potential having a magnitude which equals or exceeds the maximum value for the unknown which can be assumed for the chosen reference potential polarity. This also applies to the circuit of FIG. 2b. When switch S2 is open, capacitor C3 stores the last value until switch S2 closes again. For the case illustrated, the desired output signal is the voltage across a capacitor C3. If a significant load on capacitor C3 is anticipated, an isolation amplifier is necessary.

Both switches S1 and S2 may be replaced by diodes if desired as shown in FIG. 2b wherein they are respectively replaced by diodes D1 and D2. Then capacitor C3 would be much smaller than capacitor C2. The described technique illustrated by FIGS. 2a and 2b is similarly useful where it is known what the maximum limit of one polarity is, but where both polarities of unknown voltage could exist.

FIG. 3 illustrates the previously described principle in a practical embodiment. For reasons of superior reliability and performance, it is desirable to utilize all solid state components in the design of this circuit. To achieve the desired performance, the utilization of field effect transistors (FET) is indicated in FIG. 5. The usable input circuit components have typical maximum voltage ratings of only a small fraction of the intended input range. This problem is solved, however, by the technique indicated in the block diagram of FIG. 3.

The ultra high impedance (UHZ) low level voltage follower A3 is a direct coupled voltage follower with an overload protection circuit covered in applicant's copending applications Ser. No. 759,913, now U.S. Pat. No. 3,611,127 entitled Electrostatic Potential and Field Measurement Apparatus, and Ser. No. 759,914 now U.S. Pat. No. 3,586,911 entitled Overload Protection Circuit For Amplifier, both filed Sept. 16, 1968.

Voltage follower A3 displays a typical open loop input impedance of approximately $10^{11}$ ohms paralleled by less than 5pf. It has an open loop gain in excess of 10,000 and therefore displays a closed loop gain of $>+0.9999$. In the closed loop condition its input impedance is dictated primarily by external circuit considerations. Voltage follower A3 has a linear operating range of only a few volts and therefore cannot function by itself and be useful over the desired range of several hundred volts.

To achieve such performance, this entire circuit including its power supply is bootstrapped by a second high level voltage follower A4 which has the desired linear output range but has much too low an input impedance. This is shown in FIG. 3 where low voltage follower A3 feeds high level voltage follower A4 and the output of the latter drives the common line of the floating bootstrapped power supply 3 associated with voltage follower A3.

High level voltage follower A4 has a closed loop gain $>+0.9999$ and a closed loop input inpedance of $10^7$ ohms. The output of voltage follower A4 drives peak-to-peak detector 12, to produce an output voltage whose amplitude is equal to the voltage of the surface under measurement. An electrometer may be connected to the output of the peak-to-peak detector 12 or the DC restorer and detector circuits of FIGS. 2a and 2b, if loading is a problem.

FIG. 3 shows that the entire voltage follower A3 and its cable and input probe are shielded and this shield is driven by the output of voltage follower A3. By doing so, the effective capcitance is driven to an extremely small value of less than $10^{-4}$ times the real capacitance. If therefore a 100pf. physical total capacitance is driven in this fashion, the resultant capacitance is less than 0.01pf. This meets the requirement for negligible input capacitance even in the presence of a reasonably long shielded lead.

Figure 4:
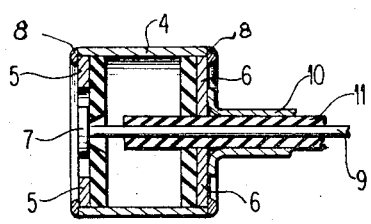
FIG. 4 is a sectional view of a probe that may be used according to the invention.

As previously discussed, it is desirable to achieve as large a capacitance as possible between the sensitive electrode and the surface under test ($C_{SP}$) consistent with adequate resolution (dictating a small diameter sensitive electrode) and voltage breakdown (dictating a minimum probe-to-surface spacing). It is similarly necessary that the capacitance between the sensitive electrode and all other objects or circuits be negligible. This is achieved by surrounding the sensitive electrode by a driven shield as described above. One way to achieve this physically is shown in FIG. 4, which discloses the probe shown in FIG. 3 in greater detail.

The probe illustrated comprises a conductive copper cylinder 4 having ends 5 and 6 connected to the driven shield. Ends 5 and 6 may be electrically connected to cylinder 4 by solder connections 8. The bottom of the probe includes circular sensitive electrode 7 insulated from and guarded by the outer ring-shaped electrode formed by end 5, which along with the previously described cylinder, comprises part of the totally shielded environment for voltage follower A3. The sensitive electrode may be formed by etching a clear ring-like area to completely surround it, thereby separating and insulating it from the outer electrode formed by end 5.

The inner conductor 9 of the cable is connected between the sensitive electrode and the input of the voltage follower A3 and is separated from outer conductor 10 by dielectric 11. The outer conductor 10 as well as copper cylinder 4 including ends 5 and 6 are driven by the output of voltage follower A3 as shown in FIG. 3.

FIG. 5 shows a preamplifier connected to function as an ultra high impedance low level voltage follower (A3) having unity gain which may be utilized according to the invention, which is substantially disclosed in applicant's copending application Ser. No. 759,813, more fully identified above.

Resistor R1 is a protective resistor functioning to prevent destruction of the input FET T2, which could occur should the gate of FET T2 be directly coupled to the sensitive electrode. Otherwise the gate input of FET T2 would effectively contact the high voltage sensitive electrode, which in turn could possibly directly contact high voltage.

Transistor T1 comprises an NPN transistor connected to have zener diode characteristics between the input and output source of FET T2. A zener diode may alternatively be substituted for transistor T1 as described in copending application Ser. No. 759,914, more fully identified above. The common connection of the base and collector of transistor T1 is connected to the gate of FET T2, and the emitter of transistor T1 is connected to the series connection of one plate of capacitor C4 and source S of FET T2. The other plate of capacitor C4 is connected through resistor R3 to the series connection of resistors R2 and R4. Resistor R4 is connected to the high voltage supply +HV through resistor R13. Since voltage follower A3 has a gain that exceeds +0.9999, its effective conductance and capacitance is reduced to a negligible value. FET T2 having a gate, a source S, and a drain D comprises the active input element of the voltage follower.

The output of voltage follower A3 is limited during overload conditions by transistor T1. If the voltage follower is overloaded, transistor T1 conducts in either forward or reverse biased manner, depending upon the polarity of the input overload. When such conduction occurs, the FET (T2) gate and output circuits are limited to a potential lower than the FET (T2) destruction potential. Transistor T1 connected thereby functions as a protective circuit to prevent destruction of FET T2 under overload conditions.

Transistor T1 connected as a diode, exhibits a typical resistance of greater than 1,000 megohms and a typical capacitance of less than 10 picofarads, and is shown connected between the input and the output of the voltage follower A3. It thus exhibits a loading effect on the voltage follower source which is reduced by a factor of greater than 10,000 by feedback, and thus becomes an effective load under normal operation conditions of greater than $10^{13}$ ohms in parallel with less than 0.001pf. Its normal loading effect is therefore negligible.

FET transistor T2 is an N channel junction FET. Resistors R2, R4, R13 and R14 bias its gate in conventional manner. Resistor R2 particularly functions as a gate leak resistor, which is bootstrapped to an extremely high value by the series connection of resistor R3 and capacitor C4 connected to the voltage follower output in source S of FET T2.

Drain D of FET transistor T2 feeds the base of PNP transistor T3 and drain load resistor R5. The collector of NPN transistor T4, a current source, is connected to the collector of transistor T3 and functions as a load for the latter. The collectors of transistors T3 and T4 and the base of PNP transistor T6 have a common connection. The load for transistor T3 is thus the collector of transistor T4, and the base of transistor T6. The latter is connected as an output emitter follower. The parallel combination of transistors T4 and T6 connected thereby to transistor T3 provides an extremely high dynamic load impedance and therefore high second stage gain, considering FET T2 as comprising the first stage.

The series connection of capacitor C5 and resistor R10 is connected between the common connection of the collectors of transistors T3 and T4 and base of transistor T6 and the floating bootstrapped power supply. It functions to stabilize the low level voltage follower in the fedback mode.

The collector of PNP transistor T5 is connected to the emitter of transistor T6 via zener diode CR1, and functions as a constant current load for the latter. The collector of transistor T5 is also connected to the emitter of transistor T3 and to resistor R5.

A connection is made from the output at the emitter of transistor T6 to source S of FET T2 to convert the preamplifier into a precision AC voltage follower having direct coupled feedback. This insures stability of the DC operating biases of the voltage follower. The emitter of transistor T6 is also connected to the driven shield.

The input capacitance of the preamplifier should be as small as practicable as previously explained. It is desirable therefore to markedly reduce the input capacitance effect on FET T2. The gate-source capacitance thereof may be reduced to an extremely small value by closing the feedback loop causing the source to precisely follow the gate. The gate-drain capacitance however would normally remain excessively large.

To solve this problem, an FET drain bootstrapping circuit is employed. Thus the gate-drain capacitance may also be reduced by introducing comparable feedback. To provide such feedback, zener diode CR1 is connected between the emitter of output emitter follower transistor T6 and the constant current load. The cathode end of zener diode CR1 functions as the power source for drain D of FET T2 and the emitter of transistor T3 of the second stage. It thus bootstraps drain D of FET T2 to provide the desired reduction in gate-drain capacitance.

It is desirable also that the distributed capacitance of the circuit be as low as practicable. The distributed capacitance may be decreased by surrounding the preamplifier with a conductive shield which may comprise a coating of conductive paint such as silver connected to the preamplifier voltage follower output.

Resistors R6–R9 and R11–R12 serve conventional biasing functions and are thus not described in detail.

The schematic diagram of FIG. 5 indicates one practical physical configuration for the block diagram of FIG. 3, but the invention is not limited thereto. Voltage follower A3 employs transistor T2 as its input FET. Its drain feeds transistor T3 whose collector load is transistor T4, a constant current load. The collectors of transistor T3 and T4 feed transistor T6, an emitter follower. Transistor T5 functions as a constant current load for transistor T6 and is connected thereto via CR1, a zener diode. Note the feedback loop is completed by the connection between the emitter of transistor T6 and the source of FET T2, thus converting the amplifier into a voltage follower. The cathode of zener diode CR1 feeds transistor T3 and T2, thus in essence bootstrapping both the source and drain of FET T2 to reduce its effective input capacitance to a very low value.

Transistor T1 is connected between the gate and source of FET T2. As thus connected, input-to-output around the voltage follower A3, its effective leakage and capacitance is reduced by the voltage follower action as previously described. T1 is a transistor chosen for its small geometry and low leakage to function as a zener diode which will conduct either as a forward biased diode or in the reverse breakdown mode in the event of an overvoltage at the amplifier input which the amplifier is incapable of following. It thus protects the amplifier.

The output of voltage follower A3 feeds transistor T7 and T8 which constitute high level voltage follower A4. Transistor T7 is connected as an emitter follower while transistor T8 is a constant current load for emitter follower T7. This constant current load includes zener diode CR3, the zener source for the base of transistor T8, and resistor R14, the current determining resistor.

Zener diode CR2 is connected between the emitter of transistor T7 and the collector of transistor T8. The anode of zener diode CR2 is also connected to and thus feeds the common line for the floating bootstrapped power supply of voltage follower A3, thus insuring the correct operating bias therefor.

The electrostatic shield in the power transformer is connected to the cathode of zener diode CR2 and feeds the floating bootstrapped power supply therethrough. As it is driven by voltage follower A3, the capcitance of this power supply to ground and line is reduced to a very small value. Resistor R16 functions as an output overload protection device to prevent destruction of transistor T7. Resistors R13 and R14 serve both to supply operating current for zener diode CR 3 and to bias the input circuitry. The ratio of resistors R13 to R14 is dependent upon the waveform of the input signal and must be optimized if the full linear range of the voltage follower is to be used. Resistor R17 and capacitor C6 serve to stabilize the closed loop system.

To be useful, voltage follower A4 must be capable of following a periodic input whose period can be several seconds long. As the input capacitance can be of the order of 1 pf., this would normally dictate an input resistor of the order of $10^{13}$ ohms. This is quite impractical both from the standpoint of availability and because the distributed capacitance of a single resistance to ground would render the system useless.

The high effective input resistance can be achieved by feedback while simultaneously stabilizing the input operating point. The following tabulation lists practicable values of related components:

| | |
|---|---|
| R2 | 10,000M - ohms |
| R3 | 0.1M - ohms |
| R4 | 100M - ohms |
| C1 | 10μf. |

Resistor R2 could be driven to the highest practicable value if resistor R3 were omitted. However, the transient performance of the system, in this case, would verge upon sustained oscillation and would be unusable. Resistor R3 functions to dampen this oscillation to a tolerable value. Resistor R1 is solely for input circuit protection in the event of an excessive input voltage.

Floating bootstrapped power supply 3 is connected to the line source of power through a transformer as conventionally known. Power supply 3 rectifies the applied AC to supply the required DC power supply for voltage follower A3.

The output of voltage follower A4 is connected to the input of peak-to-peak detector 12 which detects the output thereof, and produces an output voltage whose amplitude is equal to the voltage of the surface under measurement. The disclosed voltage follower A4 is one circuit of the type that may be employed and other equivalent circuits may be substituted therefor without departing from the scope of the invention.

I claim:
1. A wide band voltage follower circuit for deriving an output voltage whose amplitude is equal to the amplitude of the voltage of an electrostatically charged surface under measurement comprising:
   a probe having a capacitor detector arranged in spaced and non-contacting manner with the surface under measurement to detect the unknown surface voltage thereof,
   a cable connected to the output of the capacitor detector,
   a unity gain amplifier connected as an ultra high impedance low level voltage follower having an input and output, its input being connected directly to the capacitor detector output through the cable,
   first electrostatic shield means driven by the output of the ultra high impedance low level voltage follower, shielding the latter, the cable, and the probe to minimize the effective input capacitance of the ultra high impedance low level voltage follower,
   a high level voltage follower having an input and output, its input being connected to the output of the ultra high impedance low level voltage follower,
   a floating DC power supply having a DC supply output and a common line connected to power the ultra high impedance low level voltage follower, bootstrapped with the latter by the high level voltage follower through the connection of the common line of the floating power supply to the output of the high level voltage follower, and
   first means connected to the output of the high level voltage follower to derive the output voltage.

2. A wide band voltage follower as recited in claim 1 wherein the first means is a peak-to-peak detector.

3. A wide band voltage follower circuit as recited in claim 2 further comprising:
   a reference band region on the surface under measurement,
   biasing means connected to bias the peak-to-peak detector and reference band region to a reference voltage whose amplitude is equal to or greater than the maximum anticipated voltage of the derived output voltage that can be assumed for a given reference voltage polarity.

4. A wide band voltage follower as recited in claim 2 further comprising:
   electrometer means connected to the output of the peak-to-peak detector to provide a measurement of the unknown surface voltage.

5. A wide band amplifier as recited in claim 1 further comprising:
   an AC power source connected through transformer means to power the floating DC power supply, and
   second electrostatic shield means driven by the high level voltage follower output and shielding the transformer to minimize the capacitance of the AC power source to ground and line.

6. A wide band voltage follower circuit as recited in claim 5 wherein the detector is a peak-to-peak detector.

7. A wide band voltage follower circuit as recited in claim 6 further comprising:
   a reference band region on the surface under measurement,
   biasing means connected to bias the peak-to-peak detector and reference band region to a reference voltage whose amplitude is equal to or greater than the maximum anticipated voltage of the derived output voltage that can be assumed for a given reference voltage polarity.

8. A wide band voltage follower as recited in claim 6 further comprising:
   electrometer means connected to the output of the peak-to-peak detector to provide a measurement of the unknown surface voltage.

9. The wide band voltage follower as recited in claim 4 further comprising feedback means connected between the output and input of the ultra high impedance low-level voltage follower to provide high effective input resistance and stabilize the input operating point.

10. The wide band amplifier as recited in claim 5 further comprising protection means connected to the input of the ultra high impedance low-level voltage follower to prevent damage thereto in the event of excessive input voltage.

* * * * *